D. T. ENRIGHT.
END GATE.
APPLICATION FILED OCT. 21, 1916.
1,259,088.
Patented Mar. 12, 1918.
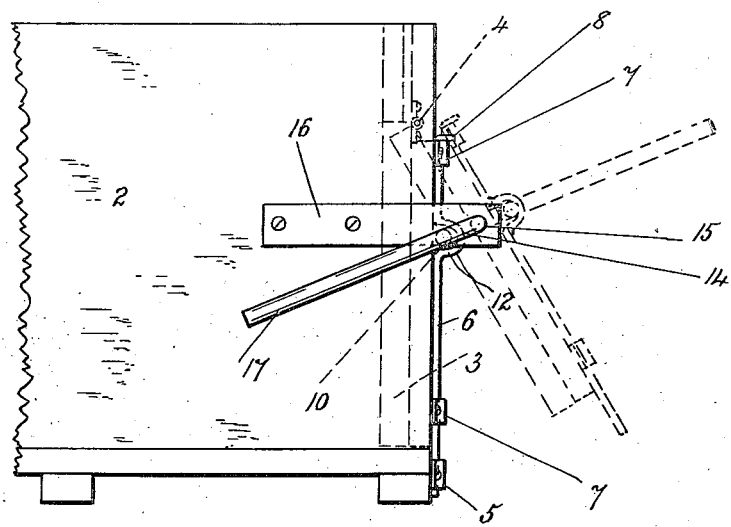
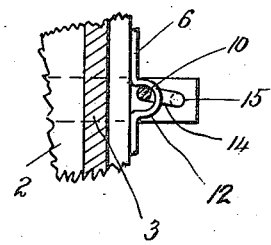
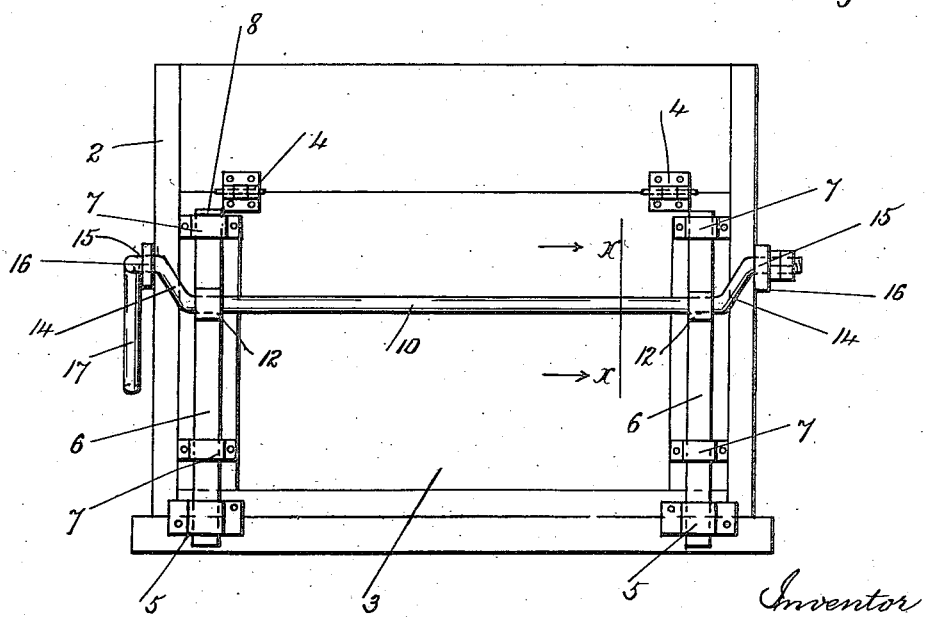
Inventor
Daniel T. Enright
by Herbert W. T. Jenner
Attorney.

UNITED STATES PATENT OFFICE.

DANIEL T. ENRIGHT, OF GARWIN, IOWA.

END-GATE.

1,259,088. Specification of Letters Patent. Patented Mar. 12, 1918.

Application filed October 21, 1916. Serial No. 126,863.

*To all whom it may concern:*

Be it known that I, DANIEL T. ENRIGHT, a citizen of the United States, residing at Garwin, in the county of Tama and State of Iowa, have invented certain new and useful Improvements in End-Gates; and I do hereby declare the following to be a full, clear, and exact description of the invention, such as will enable others skilled in the art to which it appertains to make and use the same.

This invention relates to end gates for wagons; and it consists in the novel construction and combination of the parts hereinafter fully described and claimed.

In the drawings, Figure 1 is a side view of a portion of a wagon body provided with an end gate according to this invention. Fig. 2 is an end view of the same. Fig. 3 is a detail view taken in section on the line x—x in Fig. 2.

The wagon body 2 has a discharge opening at one end which is normally closed by the gate 3. This gate is pivoted at its upper edge to the body portion by hinges 4, or in any other convenient way.

Sockets 5 are secured to the body portion below the end gate, and adjacent to the sides of the body portion. Locking bolts 6 are provided, and are arranged to slide vertically in guides 7 secured to the side portions of the end gate. When depressed, these bolts engage with the sockets 5, and lock the end gate in its closed position. One of the bolts has a stop 8 on its upper end which comes in contact with its top guide, and prevents the bolts from being pushed too far downwardly, but any other approved stop or stops may be used.

An operating crank 10 is provided, and extends across the end gate and engages loosely with loops 12 on the two locking bolts. These loops or channels are preferably formed by bending the metal of the bolts so as to form projections on the rear faces. These loops are U-shaped in form, and their open sides are placed over the crank with which they engage, and are closed by contact with the portions of the end gate against which the bolts slide.

The arms 14 of the crank have bearings 15 which are pivoted or journaled in brackets 16 which are secured to the sides of the body portion, and which project rearwardly of the end gate. One of the bearings 15 has an operating handle or lever 17 formed on or secured to it, and preferably arranged in the same plane as the crank arms.

The full lines in Fig. 1 show the parts in their positions when the end gate is closed and locked. The center of the crank 10 is a little below the center of the bearings 15 so that the bolts cannot be moved upwardly by the jars of the road when the wagon is in motion, and the weight of the handle, bolts and crank also holds the parts in position.

When the end gate is to be opened, the lever or handle 17 is turned to the position shown by dotted lines in Fig. 1. The crank is partially revolved and the bolts are raised in their guides, out of engagement with the sockets, until the crank engages with the rear parts of the loops 12 as shown in Fig. 3. The continued motion of the handle in the same direction then opens the end gate as indicated by the dotted lines in Fig. 1. The end gate is closed and locked at a single operation by moving the handle in the reverse direction.

An end gate constructed and operated in this manner is very useful for discharging grain, gravel and other similar substances from the receptacles or wagons containing them.

What I claim is:

The combination, with the body portion of a wagon having a discharge opening at its rear end, and sockets secured to the body portion below its said opening; of an end gate having its upper edge hinged to the body portion and normally closing its discharge opening, two guides secured to each side portion of the end gate and arranged near its top and bottom edges, two locking bolts slidable in the said guides and engaging with the said sockets, said bolts having U-shaped loops on their middle parts arranged between the guides and having their open sides closed by the said end gate, a stop on the upper end of one of the said bolts for engaging the upper guide in which it slides, two brackets secured to the sides of the body portion and projecting rearwardly of the end gate, and a crankshaft pivoted in the rear end portions of the said brackets and provided with a crank which engages with the loops of the locking bolts.

In testimony whereof I have affixed my signature.

DANIEL T. ENRIGHT.